This invention relates to attitude and rotational motion control and more particularly to a system for stabilizing the attitude and rotational velocity of vehicles and other bodies including space vehicles, earth-orbital vehicles or satellites, guided and ballistic missiles, as well as airborne and underwater vehicles and missiles.

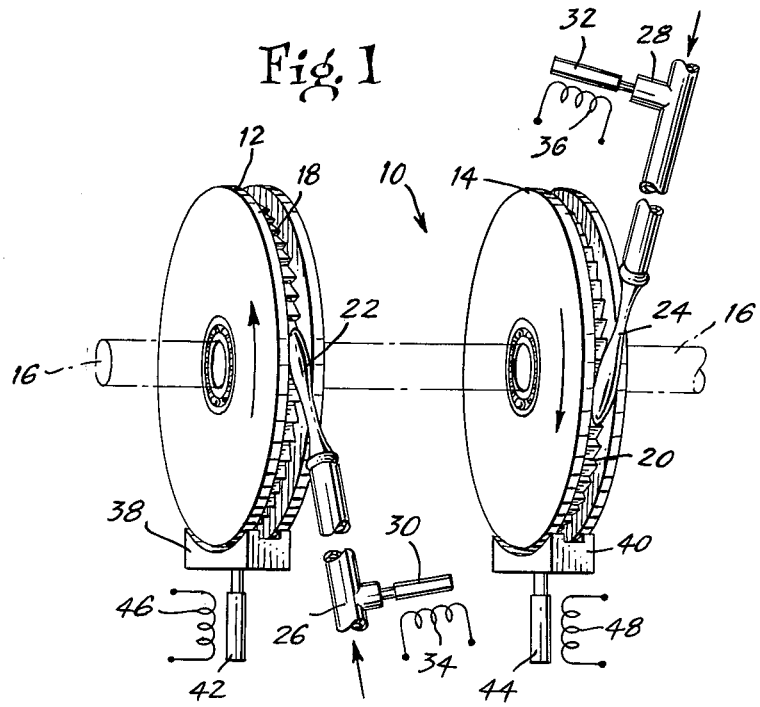
Fig. 1
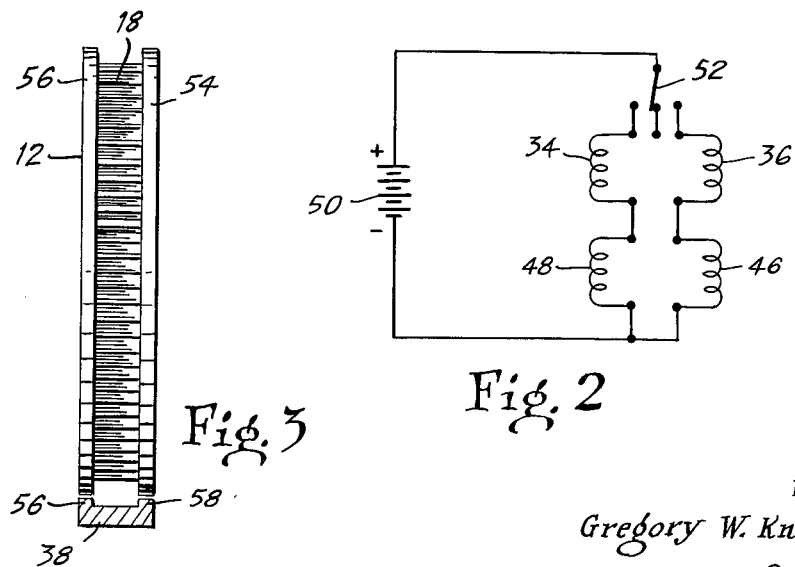
Fig. 3
Fig. 2
INVENTOR
Gregory W. Knowles,
BY 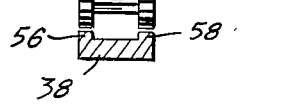
ATTORNEYS 3,111,290
ANGULAR POSITION CONTROL SYSTEM
Gregory W. Knowles, Huntington, N.Y., assignor to Fairchild Stratos Corporation, a corporation of Maryland
Filed Nov. 12, 1959, Ser. No. 852,399
4 Claims. (Cl. 244—75)

Devices employing a flywheel rotating about each of the several axes in which attitude stabilization may be required are known. Devices of this type are utilized to control the attitude and rotational velocity of bodies passing through space beyond the earth's atmosphere, which bodies cannot be controlled through rudders, ailerons or the like because of the absence of sufficient fluid necessary to react with the control elements of the body.

The known flywheels are conventionally mounted on suitable bearings of low friction so as to spin freely relative to the vehicle or body to be stabilized. Drive means such as an electric motor acts to accelerate the flywheel in either direction upon command of a controlling device or system regardless of the rotational speed existing in the flywheel at the time the command to accelerate is carried out by the electric motor or other driving device. Acceleration in a direction opposite to an existing rotation results in a decrease in rotational speed which can proceed to a stop and be followed by an increase in rotational speed in the opposite direction.

A drawback evidenced by existing systems as described above whether employing as a driving device an electric motor, turbine nozzles, or other similar device, is that energy must be expended to accelerate the flywheel in either direction, even though such acceleration may constitute a slowing down of the flywheel relative to the body to be stabilized. That is, whether the body is accelerated or decelerated energy must be expended to unbalance the rotational forces on the body so as to overcome the inertia of the flywheel mass.

The present invention avoids this disadvantage by providing novel means in the form of a pair of oppositely rotating flywheels in combination with controlled brake means for utilizing the kinetic energy stored in the flywheel to assist in the accelerations required.

It is therefore a primary object of the present invention to provide a novel attitude control system.

Another object of the present invention is to provide a novel inertia torque wheel stabilization system for space vehicles.

Another object of the present invention is to provide a torque wheel stabilization system having more efficient energy utilization for controlling the attitude and angular velocity of a body.

These and further objects and advantages of the invention will be more apparent upon reference to the following specification, claims and appended drawings wherein:

FIGURE 1 is a partially schematic diagram of the novel attitude control system of the present invention;

FIGURE 2 shows the electrical control circuit for the system of FIGURE 1; and

FIGURE 3 represents one form of flywheel which may be incorporated in the system of FIGURE 1.

An undesired angular velocity in a vehicle or body can be arrested and cancelled by accelerating a flywheel about an axis perpendicular to the plane of the undesired velocity in the direction of this velocity. The reaction on the body through the driving mechanism such as the stator of an electric motor or a turbine nozzle acts upon the body as a torque, accelerating the body in a direction opposite to the undesired rotation thus tending to reduce this rotation to zero. The controlling device or system must apply the acceleration for a time sufficient to stop the undesired rotational or angular velocity in a vehicle or body. A specific adjustment in angular position or attitude of the body may be accomplished by first accelerating the flywheel in one direction and thus imparting an angular velocity to the body followed by an opposite acceleration of the flywheel to reduce the angular velocity of the body to zero, the body in the meantime having moved to the new desired angular position.

In the present invention two flywheels instead of one are situated on each axis about which attitude stabilization is required. The flywheels are mounted separately on suitable bearings so as to spin freely and independently of each other. Each flywheel is provided with a driving device such as an electric motor or turbine nozzle so devised as to accelerate its flywheel in only one direction. The driving devices attached to any one coaxial pair of flywheels are arranged to accelerate the flywheels in opposite directions.

In addition to the driving devices, a suitable brake is attached to each flywheel capable upon application of reducing the rotative speed of the flywheel relative to the body whose position is being controlled. A suitable interconnection is provided so that as an acceleration is applied to one flywheel the brake is simultaneously applied to the other coaxial flywheel. Since the other flywheel can only rotate in a direction opposite to the first flywheel a reduction in its angular velocity through the application of the brake is tantamount to an additional acceleration of the first flywheel. Thus, the rotational energy stored in one flywheel is used to augment the effect on the body of the acceleration of the other coaxial flywheel.

Referring to the drawings, FIGURE 1 shows the novel system of the present invention generally indicated at 10 and comprising a pair of flywheels 12 and 14 rotating in opposite directions as indicated by the arrows in the drawing. Each of the flywheels is mounted upon a common rotational support indicated by dotted lines at 16 but is free to rotate upon the support completely independent of the other flywheel. They preferably rotate about an axis passing through the center of gravity of the body to be controlled. Each of the flywheels includes a series of vanes 18 and 20 forming turbine buckets about the outer periphery of the flywheel.

Adjacent each flywheel is a nozzle as indicated at 22 and 24 supplying a suitable turbine fluid to the vanes or buckets around the periphery of each wheel so as to cause fluid to impinge upon the turbine wheels to rotate them in opposite directions. The supply of fluid to the nozzle is from any suitable source in the direction indicated by the arrows on the drawings through a pair of fluid control valves 26 and 28. Valve 26 includes a solenoid plunger 30 while valve 28 includes a similar solenoid plunger 32. Plungers 30 and 32 are adapted to be energized by windings 34 and 36 with the position of the plungers determining the amount of fluid passing through the valves to accelerate the flywheels.

Adjacent the outer edge of each wheel is a brake 38 and 40 for decelerating each of the wheels. The brakes are connected to solenoid plungers 42 and 44 in turn energized through suitable coils 46 and 48.

The coils are energized from any suitable electrical source such as the battery 50 shown in FIGURE 2, through a switch 52. The position of switch 52 either at its center neutral position shown in the drawing or in a right or left position to energize respectively either the coils 34, 48 on one hand or coils 36, 46 on the other hand is determined by any suitable attitude sensing system.

FIGURE 3 illustrates one form of wheel which may be utilized in conjunction with the system of FIGURE 1 such as the wheel 12 which may be provided with central vanes forming turbine buckets 18 between outer raised edge flanges 54 and 56 adapted to be engaged by the brake 38 indicated in cross section in FIGURE 3. The brake may, if desired, include similar raised portions 56 and 58 adapted to frictionally engage the flanges 54 and 56 on the turbine wheel to arrest the angular velocity of the wheel.

If it is desired to apply a torque to a vehicle or body in a direction coincident with the indicated rotation of flywheel 12 the attitude sensing device actuates switch 52 so as to energize coils 36 and 46. Energization of coil 36 acts to open solenoid valve 28 admitting gas to nozzle 24 and accelerating flywheel 14. The reaction on nozzle 24 then applies a torque upon the vehicle or body in the desired direction.

Simultaneously, energization of coil 46 causes solenoid 42 to apply brake 38 to wheel 12 reducing the rotational velocity of this wheel. The drag reaction on brake 38 applies an additional torque to the vehicle or body in the same direction as that produced by acceleration of flywheel 14. In this way, a smaller amount of energy must be expended through nozzle 24 to accomplish a given reaction then if the brake were not present. Furthermore, the utilization of the brakes in the manner described results in a more efficient application of energy to the system where in the kinetic energy of the rotating wheel acts to augment the reaction torque applied to the body.

While the wheels have been described as coaxially mounted on an axis passing through the center of gravity of the body the present invention is not so limited. Satisfactory inertial forces may be generated by wheel rotations about a different common axis. Similarly the wheels need not be coaxial but may be mounted to rotate about parallel axes if desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be securred by United States Letters Patent is:

1. An angular position and acceleration control system for a space or fluid medium vehicle comprising a first flywheel rotatable with respect to said vehicle, means for accelerating and means for decelerating said first flywheel, a second flywheel rotatable with respect to said vehicle in a different direction from said first flywheel, means for accelerating and means for decelerating said second flywheel, each said accelerating means and decelerating means for said first and second flywheels being coupled to said vehicle to transmit the reaction torque of said acceleration or deceleration to said vehicle, and control apparatus for said accelerating means and decelerating means for causing simultaneously the deceleration of a selectable one of said flywheels and the acceleration of the other of said flywheels.

2. Apparatus as claimed in claim 1 wherein said flywheels include turbine vanes and are adapted to be driven by a fluid jet.

3. Apparatus as claimed in claim 1 wherein said flywheels are mounted for rotation about a common axis fixed with respect to said vehicle.

4. An attitude stabilization system comprising a pair of turbine wheels freely rotatable about a common axis, nozzles for supplying gas under pressure to accelerate each of said turbine wheels in a direction opposite to the other wheel, valves coupled to each of said nozzles for controlling the flow of gas to said wheels, a friction brake adjacent the periphery of each wheel, and electrical means for simultaneously opening the valve to one of said wheels and applying a friction brake to the other of said wheels.

References Cited in the file of this patent

UNITED STATES PATENTS

| 780,790 | Gelbrecht | Jan. 24, 1905 |
| 1,309,489 | Sperry | July 8, 1919 |
| 1,600,346 | MacMurchy | Sept. 21, 1926 |
| 2,999,391 | Freedbairn et al. | Sept. 12, 1961 |
| 3,048,108 | Roberson et al. | Aug. 7, 1962 |

FOREIGN PATENTS

| 377,677 | Great Britain | July 18, 1932 |